US007494332B2

(12) United States Patent
Galomb (10) Patent No.: US 7,494,332 B2
(45) Date of Patent: Feb. 24, 2009

(54) INJECTION MOLDING MACHINE APPARATUS AND METHOD OF CONSTRUCTING THE SAME

(75) Inventor: David E Galomb, Allentown, PA (US)

(73) Assignee: Galomb, Inc., Allentown, PA (US)

( * ) Notice: Subject to any disclaimer, the term of this patent is extended or adjusted under 35 U.S.C. 154(b) by 0 days.

(21) Appl. No.: 11/829,873

(22) Filed: Jul. 27, 2007

(65) Prior Publication Data

US 2008/0031995 A1 Feb. 7, 2008

Related U.S. Application Data

(60) Provisional application No. 60/834,600, filed on Aug. 1, 2006.

(51) Int. Cl.
*B29C 45/53* (2006.01)

(52) U.S. Cl. ......................... 425/162; 29/469; 425/318; 425/547; 425/574

(58) Field of Classification Search .................. 429/63, 429/162, 189, 542, 547, 549, 574, 575, 583, 429/589, 318, DIG. 57; 29/469; 434/219, 434/365, 401
See application file for complete search history.

(56) References Cited

U.S. PATENT DOCUMENTS

| | | | | |
|---|---|---|---|---|
| 3,241,191 | A * | 3/1966 | Nouel | 425/563 |
| 3,335,765 | A * | 8/1967 | Moonan | 141/20 |
| 3,454,990 | A * | 7/1969 | Collins | 425/152 |
| 3,574,897 | A * | 4/1971 | Citron et al. | 425/129.1 |
| D231,487 | S * | 4/1974 | Pracilio | D15/135 |
| 3,912,133 | A * | 10/1975 | Hehl | 222/496 |
| 4,966,538 | A * | 10/1990 | Linke et al. | 425/144 |
| 5,474,438 | A * | 12/1995 | Walker, Jr. | 425/185 |
| 6,774,806 | B1 * | 8/2004 | Bannell et al. | 340/679 |
| 2003/0188606 | A1 * | 10/2003 | Tobako | 71/177.2 |

* cited by examiner

*Primary Examiner*—Robert B Davis (57) ABSTRACT

A hand operated injection molding machine apparatus constructed from prefabricated sub-assemblies and a desired mold clamping means attached to a main support structure, and then electrically integrated with each other.

19 Claims, 12 Drawing Sheets

INJECTION MOLDING MACHINE APPARATUS AND METHOD OF CONSTRUCTING THE SAME

BACKGROUND

Hand operated injection molding machines have been around for decades. One of the first machines commercialized was built by Arburg, Inc. in 1954. It was originally designed for internal use to fabricate a particular part. However, in 1956 the company decided to sell the machines outright, ultimately selling over 10,000 units. Although the early Arburg machines were probably fine machines in their day, their mode of construction wouldn't provide the manufacturing versatility needed in today's globally competitive environment.

More recently, within the last 35 years or so, a number of other hand-operated injection molding machines have been built and marketed by various companies. For example, Educational Machinery Corporation (EMCO) produced a hand-operated injection molding instructional device, which was primarily sold to schools to demonstrate the basic process of injection molding. Honetech, Inc. produced the Honejector Injection Molder, which was very similar to the EMCO machine, except for minor differences in style. NRK Mfg. & Engineering Co. produced the Plasticor Jr. along with some molds to make plastic toy figures. Presumably the NRK machine was intended as a novelty or toy. There have also been numerous inventors and entrepreneurs who have built their own hand-operated injection molding machines over the years, with various levels of success. Many of these machines have been very basic in design, where flat and angled metal plates were simply welded together to construct the support frame, and then the individual components were then attached to it one after another until the machine is built. A popular book on the market, *Secrets of Building An Injection Molding Machine* (ISBN 1-878087-19-3) describes in detail how to build a basic injection molding machine exactly that way. What is missing from the prior art machines heretofore is that none are constructed in a way that facilitates an efficient and economical method of mass production. What is also missing from the prior art machines heretofore is that they lack the functional improvements and manufacturing versatility demanded in today's marketplace. It would therefore be desirable and advantageous to provide an improved injection molding machine apparatus and method of constructing the same to obviate the prior art shortcomings.

SUMMARY OF THE INVENTION

The present invention is a hand-operated injection molding machine apparatus and an efficient, economical method of constructing the same. Also invented are a number of functional improvements that may be employed with the invented apparatus if desired.

Accordingly, one object of the present invention is to provide a hand-operated injection molding machine apparatus that is efficiently and economically constructed.

Another object of the present invention is to provide an efficient, economical, and versatile method of construction for a hand-operated injection molding machine apparatus that facilitates mass production Another object of the present invention is to provide a hand-operated injection molding machine apparatus with additional functional improvements that may be employed if desired.

DETAILED DESCRIPTION

Overview

Figure 1:
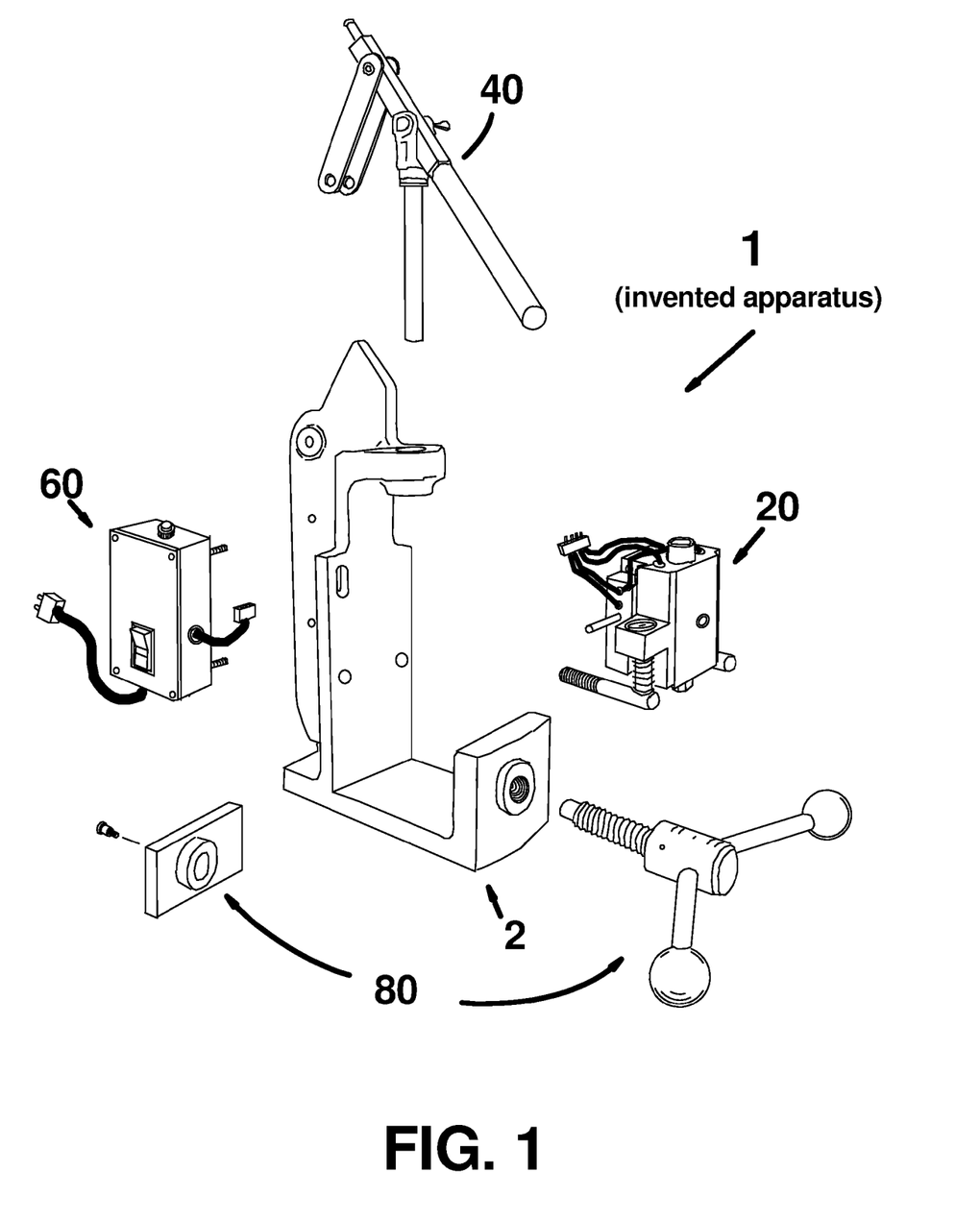
FIG. 1 is an exploded perspective view of invented apparatus

In the preferred embodiment, and as shown by FIG. 1, the invented apparatus 1 comprises at least; a main support structure, hereafter referred to as the stand 2 for brevity; a heat unit sub-assembly 20; a handle sub-assembly 40; a control box sub-assembly 60; and a mold clamping means 80. The said sub-assemblies 20, 40, 60 and the mold clamping means 80 are each attached to the stand 2 in any desired order, and then the heat unit sub-assembly 20 and the control box sub-assembly 60 are electrically integrated with each other to complete construction of the invented apparatus 1.

In the subsequent sections: the stand 2, shown by FIG. 2, will first be described in detail. Then, the heat unit sub-assembly 20, shown by FIG. 3, will be described in detail. Then the handle sub-assembly 40, shown by FIG. 4 will be described in detail. Then the control box sub-assembly 60, shown by FIG. 5 will be described in detail. Then the mold clamping means 80, shown by FIG. 6, will be described in detail. Then it will be described how sub-assemblies 20, 40, 60 and the mold clamping means 80 are each attached to the stand 2. Then it will be described how the sub-assemblies 20 and 60 are electrically integrated with each other to complete construction of the invented apparatus 1. Then it will be described how the invented apparatus 1 may comprise various other components and functional improvements, if desired. Then finally, a brief discussion of how the invented apparatus 1 operates. Accordingly:

Stand

Figure 2:
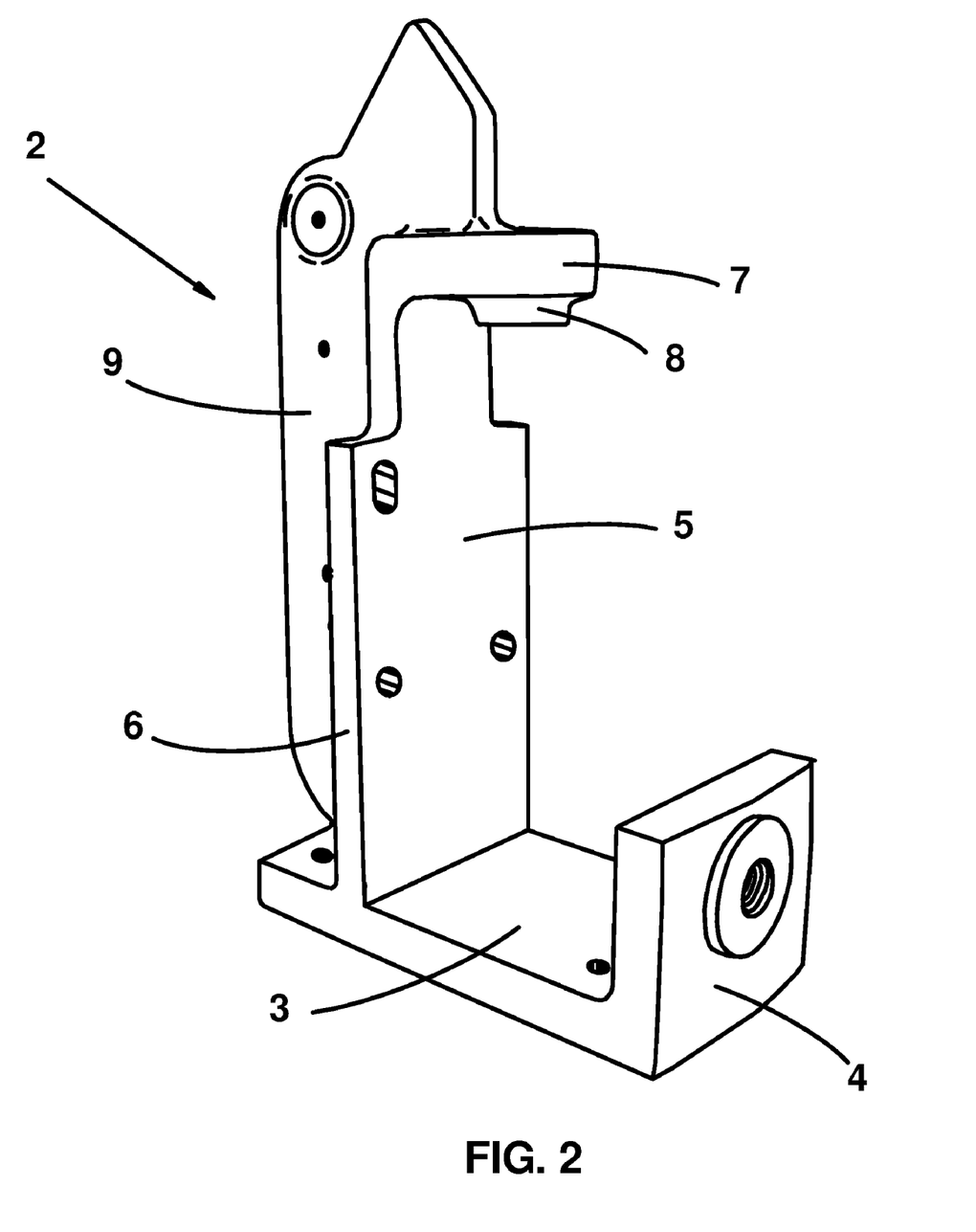
FIG. 2 is a perspective view of the stand

FIG. 2 shows the stand 2, which defines the basic framework of the invented apparatus 1 and provides the main support structure for the sub-assemblies 20, 40, 60, and the mold clamping means 80. In the preferred embodiment illustrated, the stand 2 is a unitary casting made from a desired metal. In an alternative embodiment (not shown), the stand 2 is fabricated from multiple parts and then assembled together. For example, in an alternative embodiment, the base portion and the upright portions may be separately fabricated, but then fastened together. Referring back to the illustrated embodiment, the stand 2 is machined with various holes, slots, and flattened surfaces to accommodate attachment of the sub-assemblies 20, 40, 60, the mold clamping means 80, and additional components if desired. The stand 2 may also be painted or powder coated if desired. Specific areas of the stand 2 referred to later in this detailed description are as follows: base 3, front wall 4, back wall 5, side wall 6, nose 7, nose extension 8, and back fin 9. As is apparent by viewing FIG. 2 the back fin 9 portion of the stand 2 extends above the rest of the structure, providing certain utility advantages during operation of the invented apparatus 1, which is later described in more detail.

Heat Unit Sub-Assembly

It should first be clarified, the term "heat unit" used to characterize this sub-assembly was chosen for brevity. The said sub-assembly actually includes means for not only heating a thermoplastic material, but also for containing it and injecting it. So, it should properly be considered a "thermoplastic heating and injection unit" sub-assembly. More particularly, the heat unit sub-assembly 20 of the invented apparatus 1 comprises at least: a support means; a means for containing a thermoplastic material; a means for heating a thermoplastic material; a means for transferring heat; a means for directing the flow of a thermoplastic material; a means to actuate motion; a means to sense temperature; and a means for electrical connection to other components of the invented apparatus 1.

Figure 3:
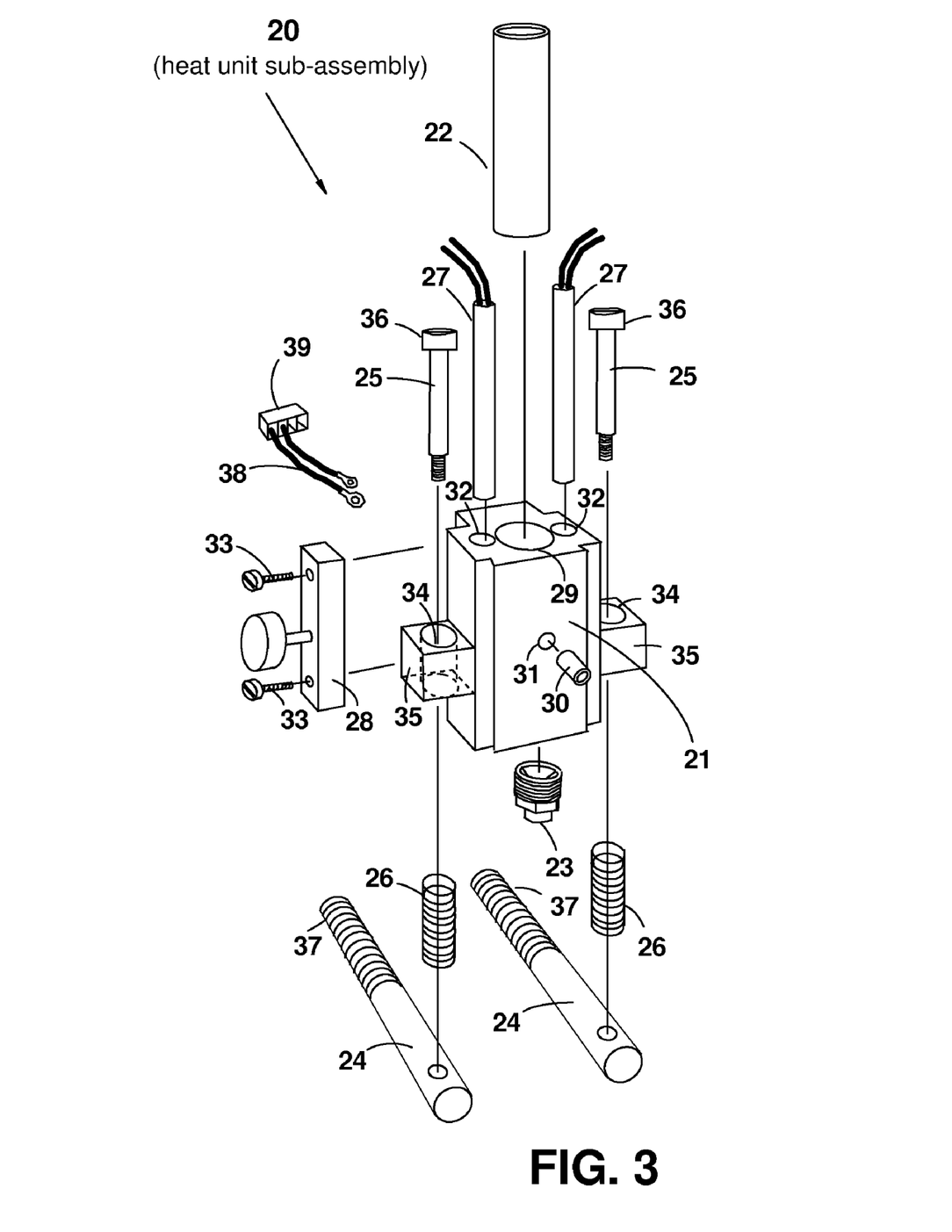
FIG. 3 is an exploded perspective view of the heat unit sub-assembly

Accordingly, as shown in FIG. 3, one preferred embodiment of the heat unit sub-assembly 20 comprises at least the following components assembled together in any desired configuration: the heater block 21; the injection tube 22; the injection nozzle 23; the support means, comprising the horizontal support member 24 and a vertical support member 25 in combination; the actuating means 26; the heating element 27; the temperature sensing means 28; and the electrical connection means 38.

In one preferred construction: the heater block 21 is machined from an aluminum billet to a desired specification; the injection tube 22 is inserted into a predrilled hole 29 in the heater block 21 and secured therein, permanently or removably, by any desired means, such as a high temperature epoxy cement, or mechanically, by means of a locking member 30, which as illustrated, may be a set screw or a tubular type spring clip inserted into a desired hole 31 in the heater block 21 until it makes contact with the injection tube 22; the injection nozzle 23 screws into the bottom portion of injection tube 22, or alternatively, into a tapped hole in the heater block 21 directly beneath the inserted injection tube 22; each heating element 27 is inserted into each predrilled hole 32 in the heater block 21; the temperature sensing means 28 is placed in close communication with the heater block 21. The said temperature sensing means 28 may be of any desired type, such as a resistance temperature device, commonly referred to as an RTD, which are available in numerous different configurations. If desired, the temperature sensing means 28 may also comprise a controlling means, allowing it to both sense the temperature and control it. The temperature sensing means 28 shown in FIG. 3 is a bi-metal type thermostat attached to the heater block 21 by means of screws 33; each post 37 of heater block 21 is positioned on top of each actuating means 26, which as illustrated are two compression springs. From above the heater block 21, each vertical support member 25 is inserted into each pre-drilled hole 34 in the post 35, also inserting it through the underlying actuating means 26 until the larger head portion 36 of the said vertical support member 25, is resting on top of the heater block post 35. Each vertical support member 25 is then attached to each horizontal support member 24, thereby captivating and slightly compressing each actuating means 26 between the horizontal support member 24 and bottom surface of the heater block post 35. The said holes 34 may be slightly counter bored if desired (not shown) to facilitate proper seating of the head portion 36 of the vertical support member 25 and partial recessing the actuating means 26 into the post 35 from below. Once each horizontal support member 24 and each vertical support member 25 are attached together, they in combination provide the support means for the heater block 21 and actuating means 26, and also serve to keep the said components in alignment during operation of the invented apparatus 1. Each horizontal support member 24 in this preferred embodiment is also threaded 37 at one end to facilitate easy attachment of the constructed heat unit sub-assembly 20 to the stand 2, which will be described later.

After the components of the heat unit sub-assembly 20 are attached together, the appropriate electrical connections are made between them, and the electrical connection means 38 is provided and attached, arranged, or otherwise created and electrically integrated with the said components. The said means 38 is designed to facilitate easy electrical integration of the heat unit sub-assembly 20 with other components of the invented apparatus 1. In the illustrated embodiment, the electrical connection means 38 is an arrangement of wires extending from desired components of the heat unit sub-assembly 20. As shown, the said electrical connection means 38 may also have a plug 39 type termination if desired.

It shall be appreciated, although certain components of the heat unit sub-assembly 20 are described here as being used in multiple, it is not intended to be a limitation. Such duplication could easily be avoided if desired to suit a particular alternative construction. For example, a single heating element 27 that coils around the injection tube 22 may be employed instead of the two cartridge type heaters illustrated.

It shall also be appreciated, although this preferred embodiment describes each component of the heat unit sub-assembly 20 as first being individually fabricated or otherwise individually provided, in alternative preferred embodiments, certain components may be unified with other components at the time they are manufactured, and such initial component separation is not intended to be a limitation. For example, if the heater block 21 is fabricated as a casting rather than being machined from a billet, the injection tube 22 could easily be embedded into it during the casting operation. Indeed, both the injection tube 22, and a coil type heating element 27 could be embedded during casting of the heater block 21 if desired.

After construction is complete, the heat unit sub-assembly 20 provides: a means to hold a thermoplastic material, the injection tube 22; a means to generate heat, the heating element 27; a means to transfer the heat to the thermoplastic material, the heater block 21; a means to control or otherwise direct the flow of the melted thermoplastic, the injection nozzle 23; a means to actuate movement, the actuating means 26, which will be explained later when describing how the invented apparatus operates; a means to sense temperature, the temperature sensing means 28; a means to support the other components of the sub-assembly 20 and facilitate their attachment to the stand 2, the support members 24 and 25 in combination; and an electrical connection means, the wire assembly 38.

It shall be appreciated; the heat unit sub-assembly 20 may also comprise additional components and functional improvements if desired, which will be described later in this detailed description.

Handle Sub-Assembly

In one preferred embodiment, the handle sub-assembly 40 comprises at least: a handle means; a ram means; a swivel means; a hinge means; and a securing means.

Figure 4:
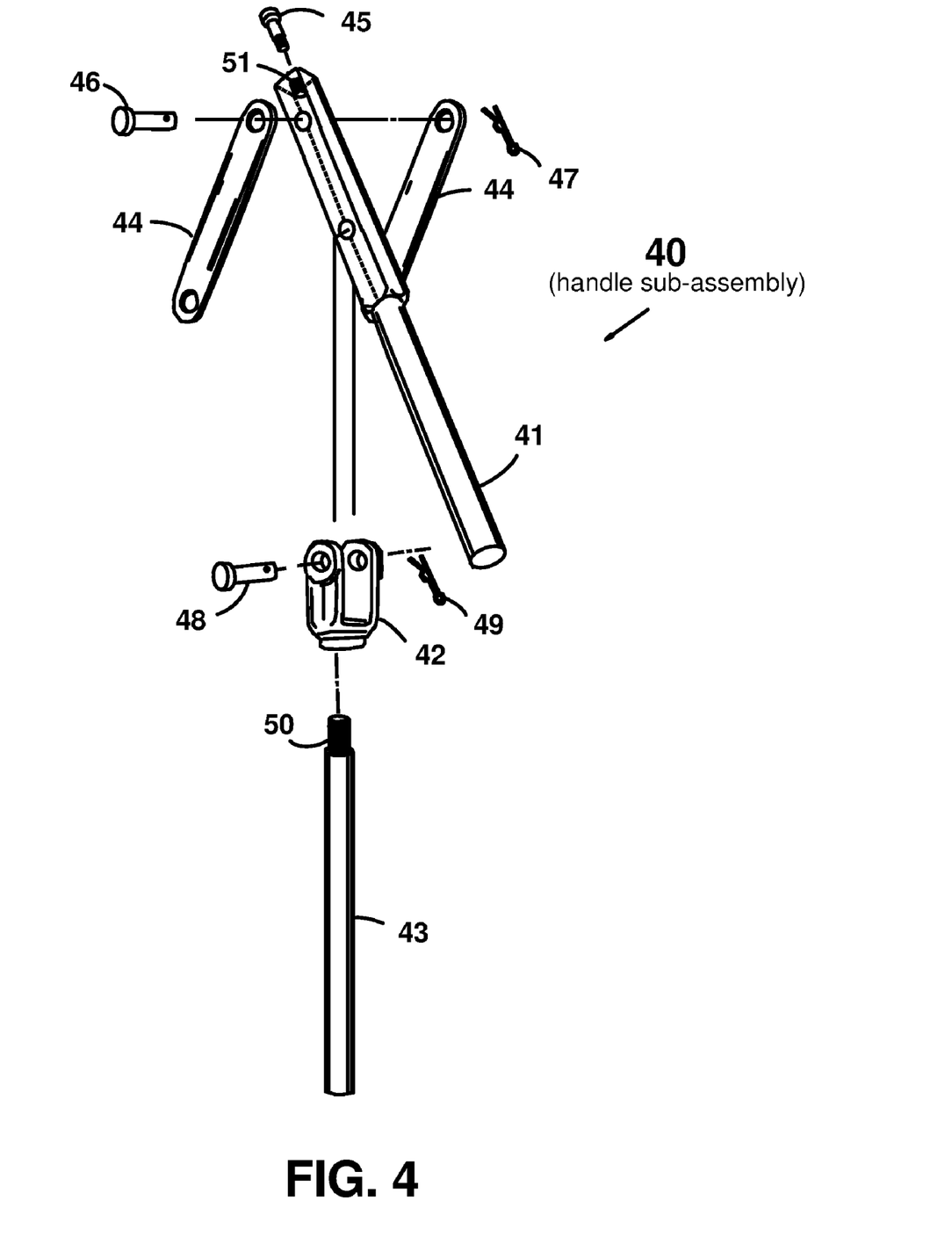
FIG. 4 is an exploded perspective view of the handle sub-assembly
Figure 7:
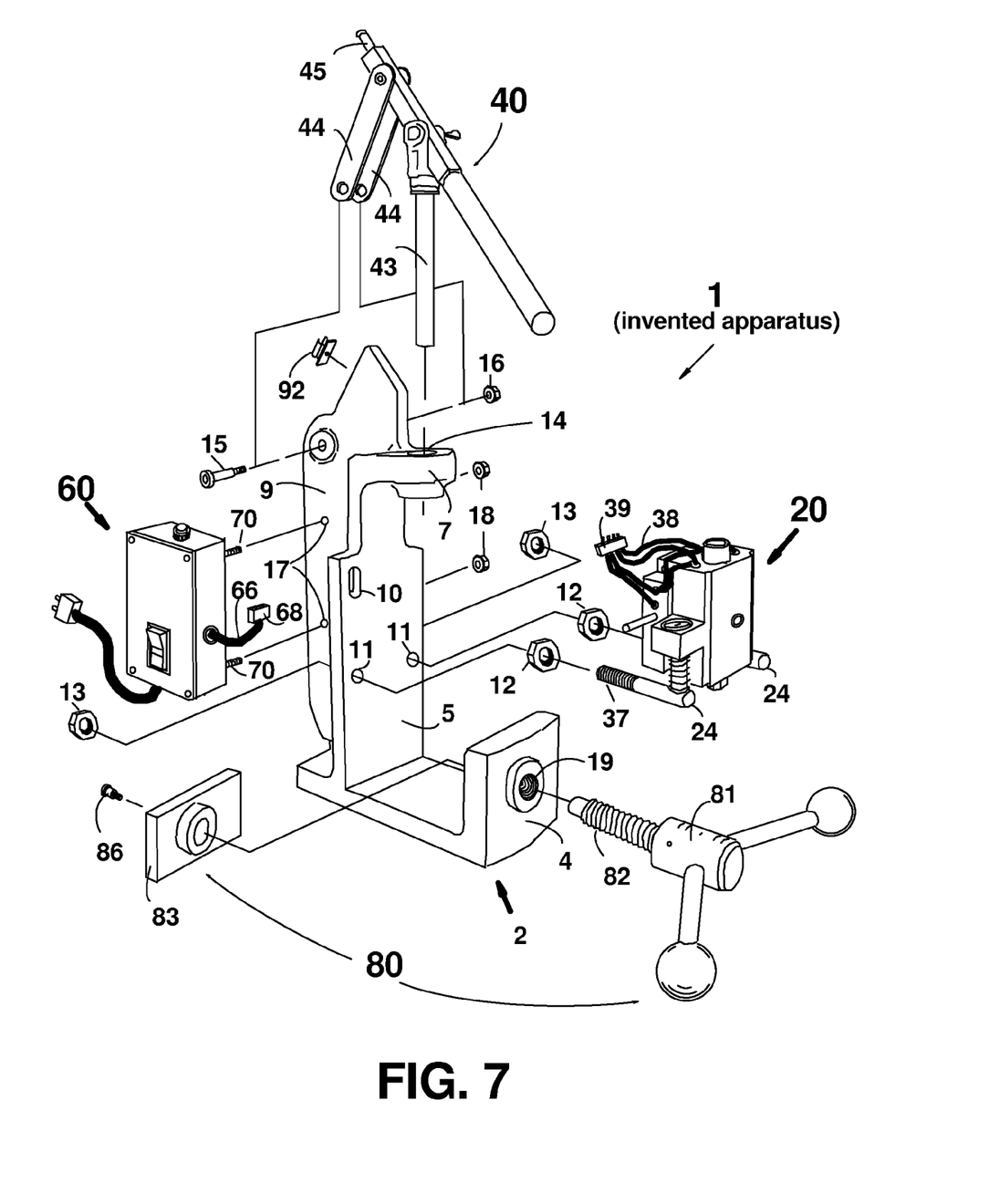
FIG. 7 is an exploded perspective view of the invented apparatus with additional hardware

Accordingly, as shown in FIG. 4, one preferred construction of the handle sub-assembly 40 comprises at least the following components assembled together in any desired configuration: the handle 41; the clevis 42; the injection ram 43; the hinge members 44; the catch pin 45. Whereas, the handle 41 is machined from metal to a desired specification to accommodate attachment of the hinge members 44, the clevis 42, and the catch pin 45; the hinge members 44 are fabricated from metal and are secured to the handle 41 by means of a hinge pin 46 and cotter 47 or similar bolt and nut, such that the said hinge members 44 may swivel freely on the handle 41; the clevis 42 is preferably fabricated from metal and attaches to the handle 41 by means of a clevis pin 48 and cotter pin 49, such that the said clevis 42 may swivel freely on the said handle 41, and be easily removed if desired; the injection ram 43 is fabricated from precision ground steel or stainless steel rod and is coated with a non-stick material. The threaded end 50 of the said injection ram 43 is screwed into a tapped hole in the bottom surface (not visible) of the clevis 42; the catch pin 45, which in this illustration is a partially threaded pin, is screwed into the tapped hole 51 in the back surface of the handle 41. It should be noted at this point, as shown in FIG. 7, the said catch pin 45 is designed to interlock with a catching means 92 that mounts near the tip of the back fin 9 of the stand 2, so when the handle 41 is lifted up during operation of the invented apparatus 1, the said catch pin 45 interlocks with the said catching means 92 and keeps the handle 41 held in its upright position until the user pulls down on it to release it. In an alternative embodiment (not shown), both the catch pin 45 and catching means 92 are embodied in the handle sub-assembly 40 together providing a releasable interlocking means, and making the stand 2 mounted catching means 92 unnecessary.

After construction is complete, the handle sub-assembly 40 comprises at least: a handle means, the handle 41; a ram means, the injection ram 43; a swivel means, the clevis 42; a hinge means, the hinge members 44; and a securing means, the catch pin 45.

It shall be appreciated, although certain components of the handle sub-assembly 40 are described above as being used in multiple, it is not intended to be a limitation. Such duplication could easily be avoided if desired in an alternative construction. For example the two hinge members 44 shown could easily be fabricated as a single component, joined by a bridge between them. The said bridge may also serve to structurally reinforce the said hinge member 44.

It shall also be appreciated, although this preferred embodiment describes each component of the handle sub-assembly 40 as being individually fabricated or otherwise individually provided, in alternative preferred embodiments, certain components may be unified with other components at the time they are manufactured, and such initial component separation is not intended to be a requirement. For example, if the hinge members 44 shown are instead fabricated as a single component, and have a reinforcement bridge between them as just mentioned, that said bridge may also be designed to function as the catching means 92 for the catch pin 45.

It shall further be appreciated; the handle sub-assembly 40 may also comprise additional components and functional improvements if desired, which are described later in this detailed description Control Box Sub-Assembly In the preferred embodiment, the control box sub-assembly 60 serves as the main junction point for the electrical circuitry of the invented apparatus 1 and comprises at least: an enclosure means; a power control means; a cord member; and a means for electrical connection to other components of the invented apparatus 1.

Figure 5:
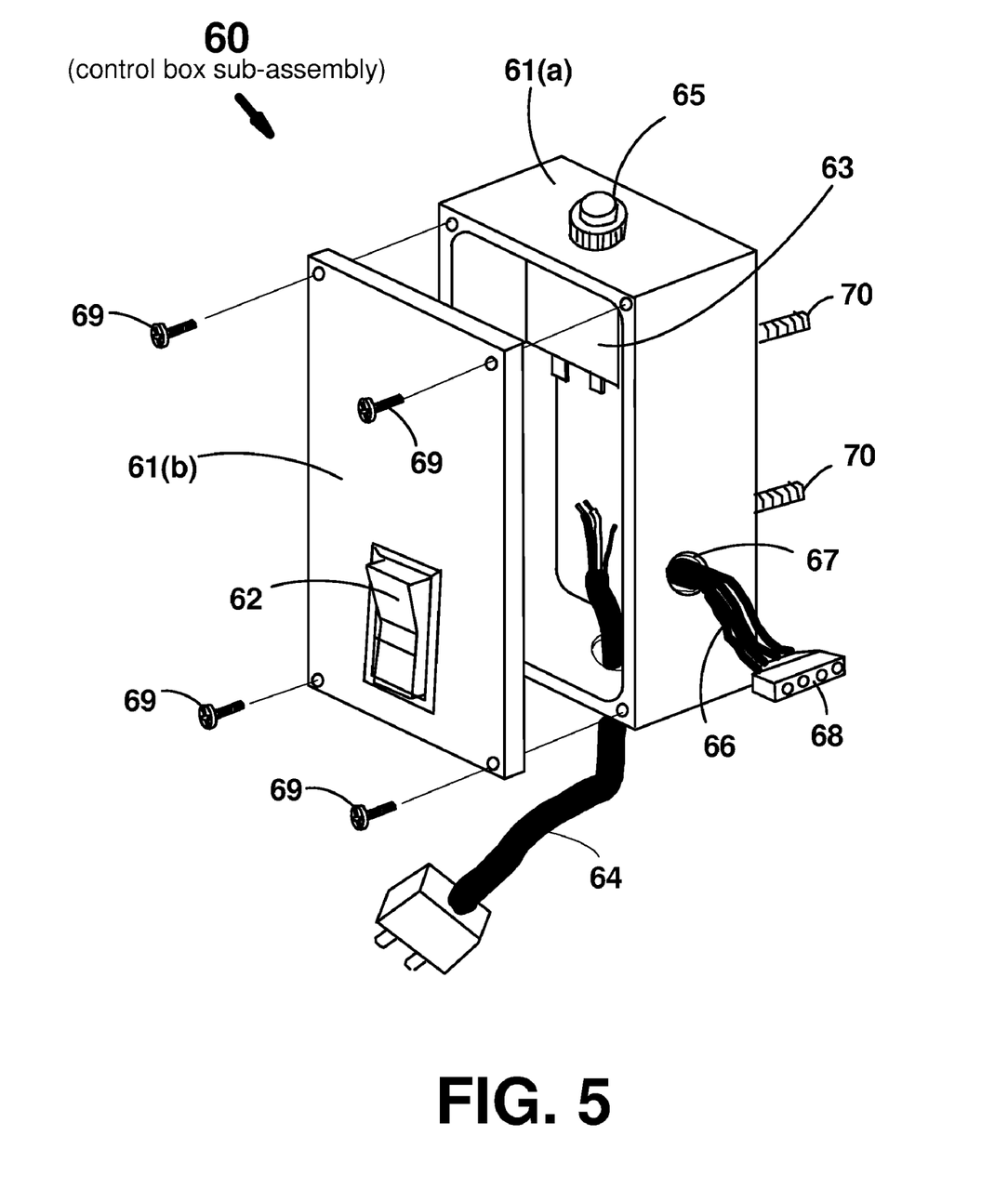
FIG. 5 is an exploded perspective view of the control box sub-assembly

Accordingly, as shown in FIG. 5, one preferred construction of the control box sub-assembly 60 comprises at least: the enclosure 61, which has two parts, the housing 61(a) and the face plate 61(b); a first power control means, the power switch 62; a second power control means, the circuit breaker 63; a cord member, the power cord 64, and an electrical connection means 66.

The circuit breaker 63 is secured inside the housing 61(a), and has a reset button 65 that is accessible from outside the enclosure 61. The power switch 62 is mounted to the face plate 61(b) and has a switch portion that is accessible from outside the enclosure. The power cord 64 wires, opposite the plug end, are inserted through a desired hole in the control box housing 61(a). After the components are attached or otherwise properly positioned, the appropriate electrical connections are made between them, and the electrical connection means 66 is attached, arranged, or otherwise created and electrically integrated with the said components. The said connection means 66 is designed to facilitate easy electrical integration of the control box sub-assembly 60 components with external components. In the illustrated embodiment, the said electrical connection means 66 is an arrangement of wires extending from desired components of the control box sub-assembly 60 through a desired hole 67 in the enclosure 61. As shown, the said means 66 may have a plug 68 type termination if desired. The said plug 68 may also be a type that fixedly mounts to the enclosure by press-fitting it into the said hole 67 if preferred. After the internal electrical connection are made, the face plate 61(b) portion of the enclosure 61 attaches to the housing 61(a) portion of the enclosure 61 by means of screws 69. Threaded studs 70 are welded to the back surface of the housing 61(a) to accommodate later attachment of the control box sub-assembly 60 to the stand 2.

In an alternative preferred embodiment (not shown), the control box sub-assembly 60 is more elaborate, having a holding bracket portion that fixedly mounts to the stand 2, and an enclosure portion that removably attaches to the holding bracket portion. Whereas, some of the electrical components are housed in the holding bracket portion, and some are housed in the enclosure portion. For example, a circuit breaker, a power switch, and a connection means may be housed in the holding bracket portion, and a temperature control means and temperature display means may housed in the enclosure portion. Thus, allowing the user to remove the enclosure portion from the holding bracket portion for easier viewing of the display and access to the said control means, and then return it back to the holding bracket when finished. Preferably, the said enclosure components and holding bracket components are electrically connected to each other by means of a wire or similar cord member.

It shall be appreciated, although certain components of the control box sub-assembly 60 are described above as being used in multiple, it is not intended to be a limitation. Such duplication could easily be avoided if desired in an alternative construction. For example, instead of having a first power control means, the power switch 62, and a second power control means, the circuit breaker 63, both embodied in the control box sub-assembly 60, the circuit breaker 63 could alternatively be comprised as a component of the heat unit sub-assembly 40.

It shall also be appreciated; the control box sub-assembly 60 may comprise additional components and functional improvements, which will be described in a later section of this detailed description.

Mold Clamping Means

In the preferred embodiment, the mold clamping means 80 secures an injection mold to the invented apparatus 1, and comprises at least: a handle means; an actuating member; and a push plate.

Figure 6:
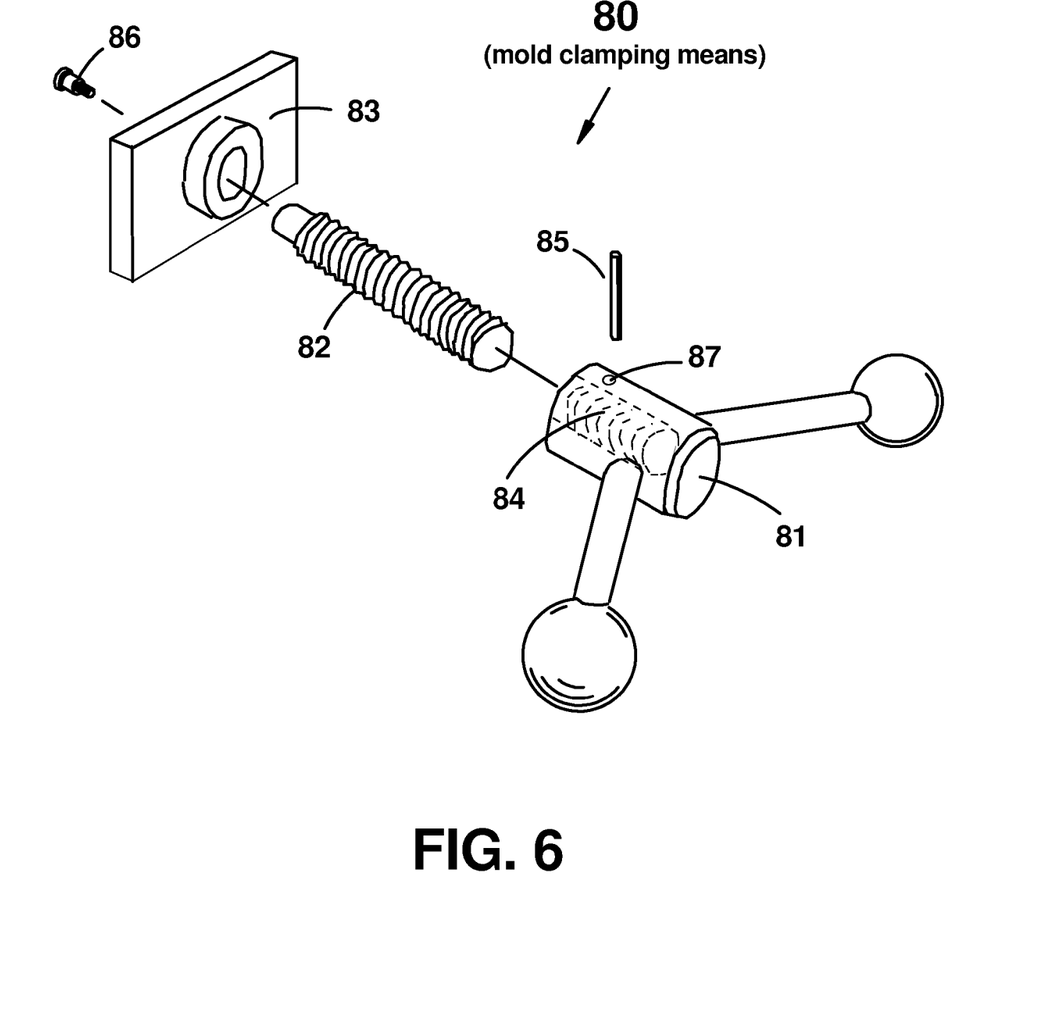
FIG. 6 is an exploded perspective view of the mold-clamping means

As shown in FIG. 6, one preferred embodiment of the mold clamping means 80 comprises at least: the handle means 81, which as shown, is a vise handle fabricated from steel with plastic balls for easy gripping; the actuating member 82, which as shown, is a steel threaded rod; the push plate 83, which as shown is an iron casting. Whereas, the actuating member 82 is secured to the handle means 81 by screwing it into a threaded hole 84 in the hub of the said handle means 81 and then securing it by means of a roll pin 85 that press-fits into a drilled hole 87 in the said hub. The push plate 83 is secured to the actuating member 82 by means of a screw 86. However, it should be noted, as is evident by viewing FIG. 7, after the actuating member 82 is attached to the handle means 81, they must first be screwed into the threaded through hole 19 in the front wall 4 of the stand 2 before the push plate 83 is secured to the actuating member 82.

It shall be appreciated; the mold clamping means 80 may have alternative constructions without departing from the spirit of the invention. For example, the actuating member 82 could simply push forward and retract to clamp the mold, such as in a toggle type mold clamping means (not shown). Whereas, in that embodiment, the handle means 81 operates in a lever fashion to clamp the mold, rather than a turning motion, and the push plate 83 is typically fabricated as a round disc that screws onto the end of the actuating member 82 by means of a screw 86.

It shall also be appreciated the handle sub-assembly 80 may comprise additional components and functional improvements if desired, which will be described later in this detailed description Method of Constructing the Invented Apparatus In the preferred embodiment, the invented apparatus 1 is constructed by attaching the heat unit sub-assembly 20, the handle sub-assembly 40, the control box sub-assembly 60, and the mold clamping means 80 to the stand 2 in any desired order, and then electrically integrating the heat unit sub-assembly 20 with the control box sub-assembly 60.

More particularly, and as shown in FIG. 7, one preferred method of constructing the invented apparatus 1 is as follows: the heat unit sub-assembly 20 is attached to the back wall 5 of the stand 2 by securing the two horizontal support members 24 to the said back wall 5. Whereas, a first nut 12 is screwed onto the threaded end 37 of each horizontal support member 24. The horizontal support members 24 are then inserted through corresponding holes 11 in the back wall 5, so their threaded ends 37 extend through the said wall 5 to the other side. A second nut 13 is then attached to each said threaded end 37 from behind the said wall 5, thus securing the heat unit sub-assembly 20 to the back wall 5. By adjusting the relative position of the nuts 12 and 13 along the threaded portion 37 of the support member 24, the position of the heat unit sub-assembly 20 may be adjusted relative to the back wall 5; the handle sub-assembly 40 is positioned over the stand 2 and lowered so the injection ram 43 inserts through the reamed hole 14 in the nose 7 of the stand 2 until the clevis 42 rests on top of the said nose 7. The free end of the hinge members 44 are secured to the back fin 9 by means of a bolt 15 or similar pin, such that the said back fin 9 is interposed between the said two hinge members 44. A nut 16 or similar locking means secures the said bolt 15 in place; the control box sub-assembly 60 is secured to the back fin 9 of the stand 2 by inserting the threaded studs 70 extending from the back surface of the control box housing 61(*a*) through desired holes 17 in the back fin 9, and then attaching nuts 18 to them from the opposite side of the said back fin 9; the handle means 81 and actuating member 82 of the mold clamping means 80, having already been attached to each other, are screwed into the threaded through the hole 19 in the front wall 4 of the stand 2, and then attached to the push plate 83 by means of a screw 86. Alternatively, the mold clamping means 80 may bolt directly to the base 3 of the stand 2 if it is an alternative toggle type mold clamping means previously described (not shown). Now that the sub-assemblies 20, 40, 60 and the mold clamping means 80 are attached to the stand 2, the heat unit sub-assembly 20 and the control box sub-assembly 60 are electrically integrated with each other by joining together the electrical connection means 38 of the heat unit sub-assembly 20 with the electrical connection means 66 of the control box sub-assembly 60. In the embodiment shown, the said connection means 38 and 66 both have a plug type terminations 39 and 68 respectively, allowing the said means 38 and 66 to be joined together simply by plugging them into each other. Typically, in the embodiment shown, the electrical connection means 66 and attached plug 68 are fed through the slotted hole 10 in the back wall 5 of the stand 2 to reach the connection means 38 and attached plug 39. However, as described before, if the electrical connection means 66 employs a plug 68 that fixedly mounts to the control box housing 61(*a*), essentially serving as a plug-in receptacle, obviously the electrical connection means 38 and attached plug 39 would instead need to be fed through the said hole 10 to reach that said receptacle type plug 68.

Figure 8:
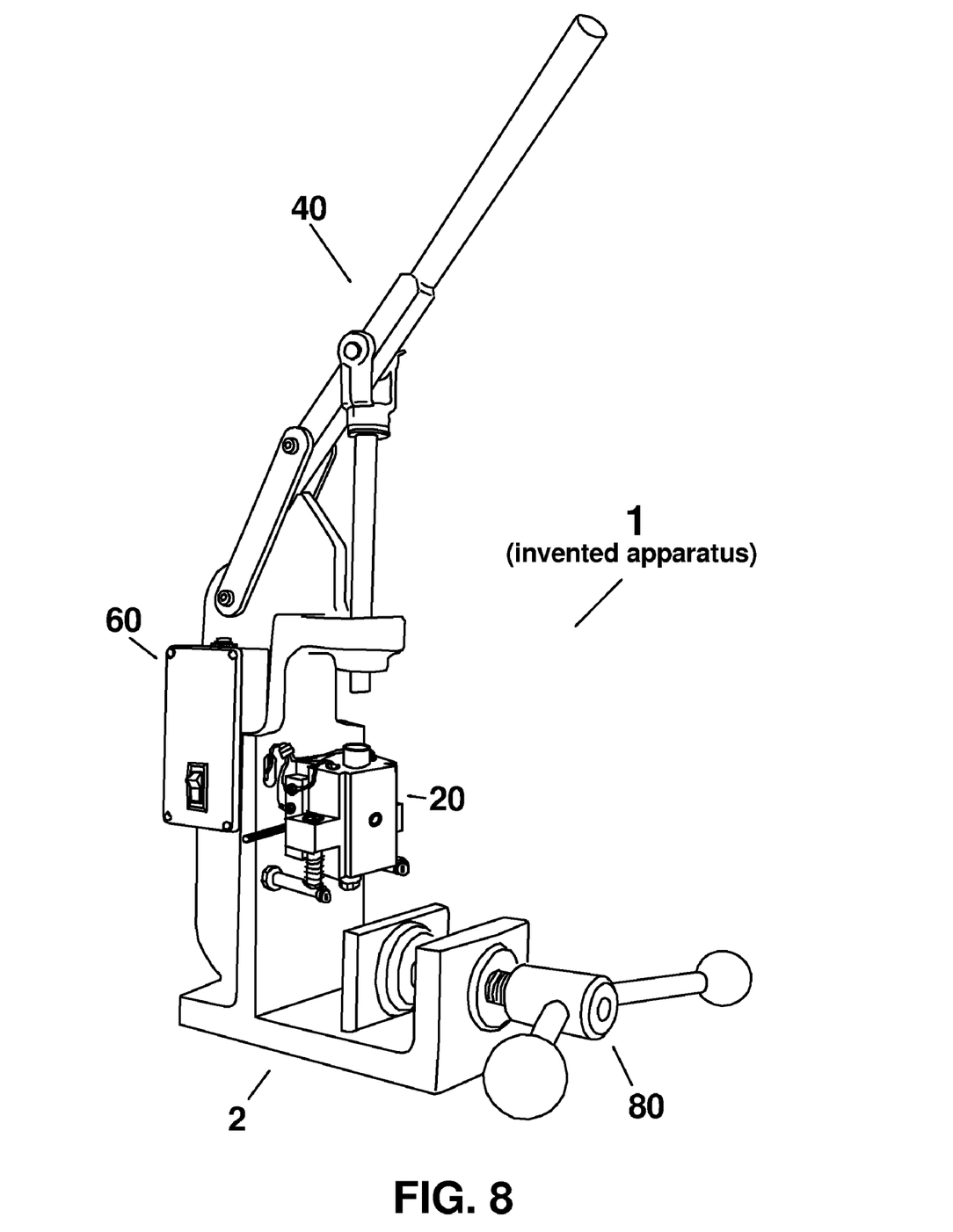
FIG. 8 is a perspective view of the assembled invented apparatus

Now that the sub-assemblies 20, 40, 60 and the mold clamping means 80 have been attached to the stand 2, and the heat unit sub-assembly 20 and control box sub-assembly 60 have been electrically integrated with each other, construction of the invented apparatus 1 is now complete, as shown in FIG. 8.

The end result is a hand operated injection molding machine apparatus constructed from prefabricated sub-assemblies and a desired mold clamping means attached to a main support structure, and then electrically integrated with each other. This novel method of construction allows a manufacturer to provide many alternative embodiments of a desired sub-assembly without having to substantially modify the rest of the apparatus. For example, in the illustrated preferred embodiment: the control box sub-assembly 60 could be easily substituted with another one that is more complex, because after the said sub-assembly 60 is constructed, it simply attaches to the stand with two nuts and then plugs into the heat unit sub-assembly 20; Likewise, the heat unit sub-assembly 20 could be constructed in many alternative embodiments, having various degrees of complexities and/or plastic holding capacities, because after the said unit 20 is constructed, it simply attaches to the stand with nuts, and then plugs into the control box sub-assembly 60; the handle sub-assembly 40 could also be easily substituted with a more elaborate embodiment, such as one having a built-in interlocking means previously described, or a more complex handle that is extendible in length, because after the said unit 40 is constructed, it simply attaches to the back fin 9 of the stand 2 with a single bolt 15 and nut 16. Even the stand 2 itself could be substituted with an alternative embodiment without significant difficulty, since the sub-assemblies 20, 40, 60 attach to it with minimal integration. Such an advantage would be particularly attractive to someone who wishes to produce the apparatus 1 as a private label manufacturer for a number of different distributors. Whereas, the said manufacturer could provide each distributor with a slightly different construction of the stand 2, to distinguish each one in the marketplace.

It shall be appreciated; this disclosed method of construction also facilitates economical mass production, because it allows each sub-assembly to be manufactured independently, wherever it can be done most cost effectively. It shall also be appreciated, the versatility of the present construction sharply contrasts with the prior art machines that by far have sought to achieve manufacturing economy by eliminating parts and attempting to "build-in" or otherwise integrate various components with the main support structure in one way or another, thereby forcing the manufacturer to substantially construct each machine from the ground up at a single location, as well as greatly limiting the machine's ability to accommodate alternative constructions without significant modification.

As suggested earlier, the invented apparatus 1 may also comprise additional components and functional improvements if desired to suit a particular alternative embodiment. Some of these will now be described below, without limitation.

Additional Components and Improvements

Figure 9:
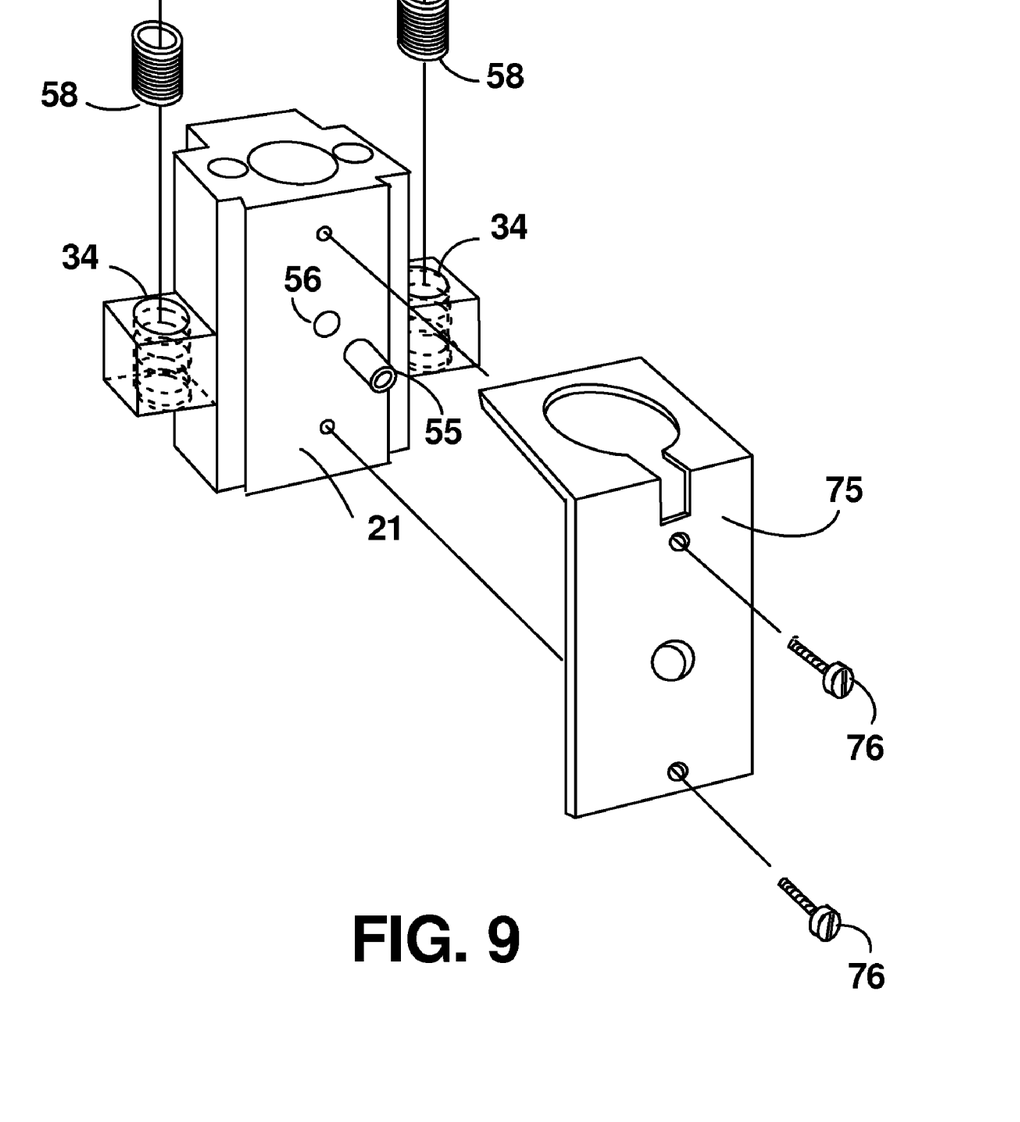
FIG. 9 is an exploded perspective view of an adjustment means, heater block, bracket, and probe port

As shown in FIG. 9, one improvement of the invented apparatus 1 is the heat unit sub-assembly 20 (shown in FIG. 3) that further comprises an adjustment means 58. Whereas, in one preferred embodiment the said adjustment means 58 is a threaded insert or similar sleeve type bushing that recesses into the hole 34 of the heater block 21; and whereas, the said hole 34 is threaded to accommodate the adjustment means 58; and whereas, the said adjustment means 58 may be adjusted either up or down within the said hole 34 to alter the compressive force on the actuating means 26 also shown in FIG. 3, thereby altering the position, and/or orientation of the heater block 21, as well as altering the compressive force required to initiate actuation of the said actuating means 26.

As shown in FIG. 3 and FIG. 9, another improvement of the invented apparatus 1 is a heat unit sub-assembly 20 that further comprises a temperature probe port 55. Whereas, in one preferred embodiment the said probe port 55 is a hollow tube member that recesses into a desired hole 56 the heater block 21 and terminates in close proximity to the injection tube 22. In another preferred embodiment, the locking member 30 that secures the injection tube 22 in the predrilled hole 29 also functions as the probe port 55. The said temperature probe port 55 allows the user to insert a probe from a remotely located temperature measurement device and monitor the internal temperature of the heater block 21.

Another improvement of the invented apparatus 1 is the heat unit sub-assembly 20 further comprising a protective means. As shown in FIG. 3 and FIG. 9, the said protective means in this preferred embodiment is a bracket 75 that mounts to the heater block 21 by means of screws 76 and provides the electrical components of the heat unit sub-assembly 20 with protection against contamination, electrical shorts, and heat loss, as well as providing a magnetic surface to accommodate a magnetically mounted a bi-metal temperature display means 59, which is evident by viewing FIG. 10. The said bracket 75 also keeps the heating elements 27 from slipping out the hole 32 during operation of the invented apparatus 1. It should be noted however, if the said electrical components are adequately protected and secured by other means, such as an enclosure or other protective means, the said bracket 75 may or may not be desired.

Figure 10:
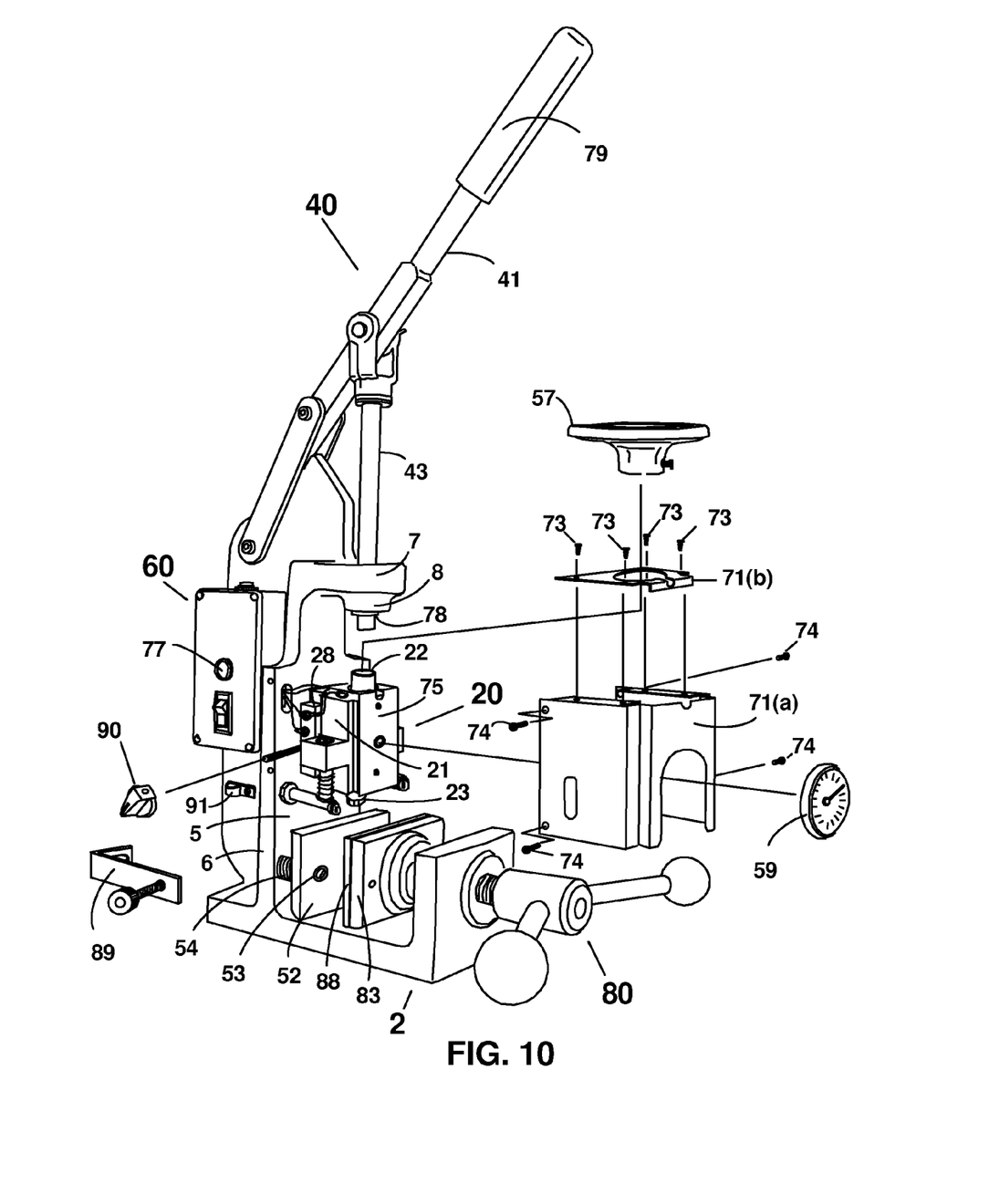
FIG. 10 is a perspective view of the invented apparatus with an exploded view of additional components and improvements

As shown in FIG. 10, another improvement of the invented apparatus 1 is an adjustable position backing plate 52 mounted to the back wall 5 of the stand 2 by means of screws 53. The said backing plate 52 is typically positioned so it opposes the push plate 83 of the mold clamping means 80 and may be shimmed forward with washers 54 or similar spacers to a desired distance away from the back wall 5. The said adjustable position backing plate 52 allows the user to easily line up the mold (not shown) with the injection nozzle 23 relative to the said back wall 5.

As shown in FIG. 10, another improvement of the invented apparatus 1 is a mold clamping means 80 further comprising a removable push plate face 88. The said face 88 is secured to the push plate 83 by any desired means, typically by means of screws or magnetically attached, and may be provided in various sizes to accommodate the particular mold size being used, thereby providing a more evenly distributed force against the said mold (not shown) when clamping it. The said push plate face 88 may be constructed from any desired material, and may be preferably heat conductive, or alternatively heat resistant to suit a particular application.

Another improvement of the invented apparatus 1 is a stripping means to help remove any residual thermoplastic material that may stick to the injection ram. In the illustrated preferred embodiment, as shown in FIG. 10, the said stripping means is a bushing 78 that press-fits into the reamed hole 14 of the nose 7 and extends slightly below the bottom surface of the nose extension 8, such that its exposed bottom edge functions as a means to "strip off" any residual plastic that sticks to the injection ram 43 when the handle 41 is lifted.

Another improvement of the invented apparatus 1 is a temperature responsive paint (not shown) applied to any desired surface of the said apparatus 1 to provide the user with a visual indication when the temperature of the said painted surface has changed.

Another improvement of the invented apparatus 1 is an illumination means (not shown), typically an LED or an incandescent lamp, integrated into the circuitry of the invented apparatus 1. The said illumination means is secured to the invented apparatus 1 at any desired location, preferably where it illuminates the top of the mold (not shown), to provide the user with more visibility when aligning the said mold underneath the injection nozzle 23.

Another improvement of the invented apparatus 1 is the handle sub-assembly 40 shown in FIG. 4 that alternatively comprises an adjustable length handle (not shown). Whereas, the said handle has multiple components that may include a spring loaded mechanism allowing it to be extended for added leverage when the user operates the machine, and then automatically retractable when the user lets go of it. The said adjustable length handle may also be lockable at predetermined lengths.

Another improvement of the invented apparatus 1 is the handle sub-assembly 40 shown in FIG. 4 that alternatively comprises a multi-component injection ram (not shown). Whereas, the said ram has at least a marginal head portion and a marginal shaft portion; and, if desired, the head portion may vary in length and/or diameter from that of the shaft portion; and the head portion and shaft portion may be constructed of similar or alternatively dissimilar materials; and the head portion may removably attach to the shaft portion. The said multi-component ram being designed to reduce sticking of thermoplastic materials to the ram and improve the functionality and versatility of the injection ram 43 as it is presently shown.

As shown in FIG. 10, the invented apparatus 1 may also comprise a pellet tray 57 that slips over the exposed top portion of injection tube 22 to capture and funnel the plastic pellets (not shown) into the said tube 22. The said pellet tray 57 is desirable when the injection tube 22 is fabricated as a substantially straight tubular member. However, it should be noted, the said tray 57 may not be desired if the top portion of the injection tube 22 is flared out or otherwise designed to accomplish the same.

As shown in FIG. 10, the invented apparatus 1 may also comprise a protective enclosure 71 that surrounds the heat unit sub-assembly 20. In the illustrated preferred embodiment, the protective enclosure 71 is comprised of two parts, a cover shield 71(a) and a top plate 71(b).

The said cover shield 71(a) and top plate 71(b) attach to each other by means of screws 73, and the protective enclosure 71 may attach to the stand 2 at any desired location by any desired means. In the illustrated embodiment, the cover shield 71(a) is secured to the side walls 6 of the stand 2 by means of screws 74. The protective enclosure 71 is desirable in many preferred embodiments as a means to protect users from accidentally burning themselves. However, it should be noted, in alternative embodiments, if that danger is reduced, the said enclosure 71 may not be desired. For example, if the heater block 21 is constructed partly from a composite material, or has a heat resistant shell or protective bracket 75 that minimizes its surface temperature, the protective enclosure 71 may or may not be desired.

As shown in FIG. 10, the invented apparatus 1 may comprise a temperature display means 59. The said display means 59 may be a powered device and electrically integrated into the circuitry of the invented apparatus 1, or alternatively, and as illustrated, may be a non-powered mechanism, such as a bi-metal type thermometer. The said temperature display means 59 may be attached to the invented apparatus 1 wherever desired. In one preferred embodiment, the temperature display means 59 is mounted in close communication with the heater block 21, which is preferable when the said display means 59 is a non-powered bi-metal thermometer. In another preferred embodiment, the said display means 59, is in electrical communication with the temperature sensing means 28 and may be a component of the control box sub-assembly 60, or alternatively the heat unit sub-assembly 20. As shown in FIG. 10, the invented apparatus 1 may comprise a status indicator 77 to monitor and/or advise the user of any desired condition of the invented apparatus 1. In one preferred embodiment the status indicator 77 is a lamp that lights up when the power is turned on. In another preferred embodiment the status indicator 77 is a lamp that cycles on and off in synchronization with the intermittent energizing of the heating element 27 of FIG. 3. The said status indicator 77 is preferably integrated into the electrical circuitry of the invented apparatus 1, and may be attached wherever desired. FIG. 10 shows the said status indicator 77 as a component of the control box sub-assembly 60.

As shown in FIG. 10, the invented apparatus 1 may also comprise numerous other components if desired. For example and without limitation, a rubber handle grip 79 slipped onto the handle 41 for added user comfort (shown already attached); a power cord 64 hold down clip 91 mounted to the back fin 9 of the stand 2 for added safety; an adjustable mold stop 89 that removably attaches to the stand 2 to facilitate lateral alignment of the mold (not shown); an accessory holding clip (not shown) mounted to the back fin 9 of the stand 2 for added convenience. A thermostat control knob 90, for attachment to the temperature sensing (and control) means 28. The said knob 90 is preferably made of a heat resistant material, such as phenolic.

Figure 11:
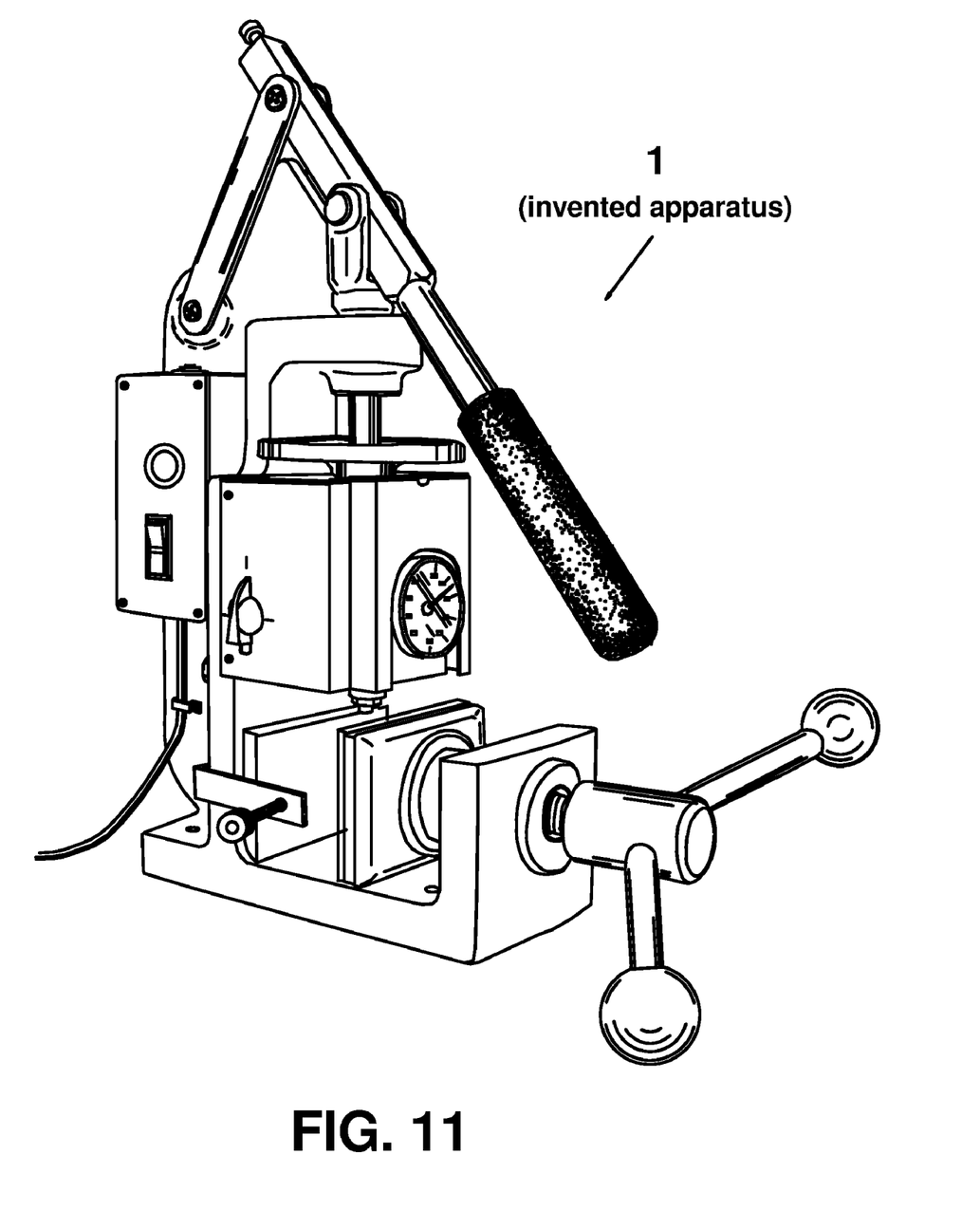
FIG. 11 shows FIG. 10 with the exploded components now attached

FIG. 11 shows the invented apparatus 1 with the exploded components of FIG. 10 now attached.

Operation of the Invented Apparatus

It should first be explained, all of the elements referred to in this section have been previously described in detail. However, because some of these elements are obstructed from view by other elements when the invented apparatus 1 is constructed, they cannot all be shown together in FIG. 12, which supplements this section of the detailed description. Therefore, for a clearer view of the elements 3, 5, 7, and 9 the reader is asked to refer to FIG. 2; for a clearer view of the elements 21, 22, 26, and 28 the reader is asked to refer to FIG. 3; for a clearer view of element 92 the reader is asked to refer to FIG. 7

Figure 12:
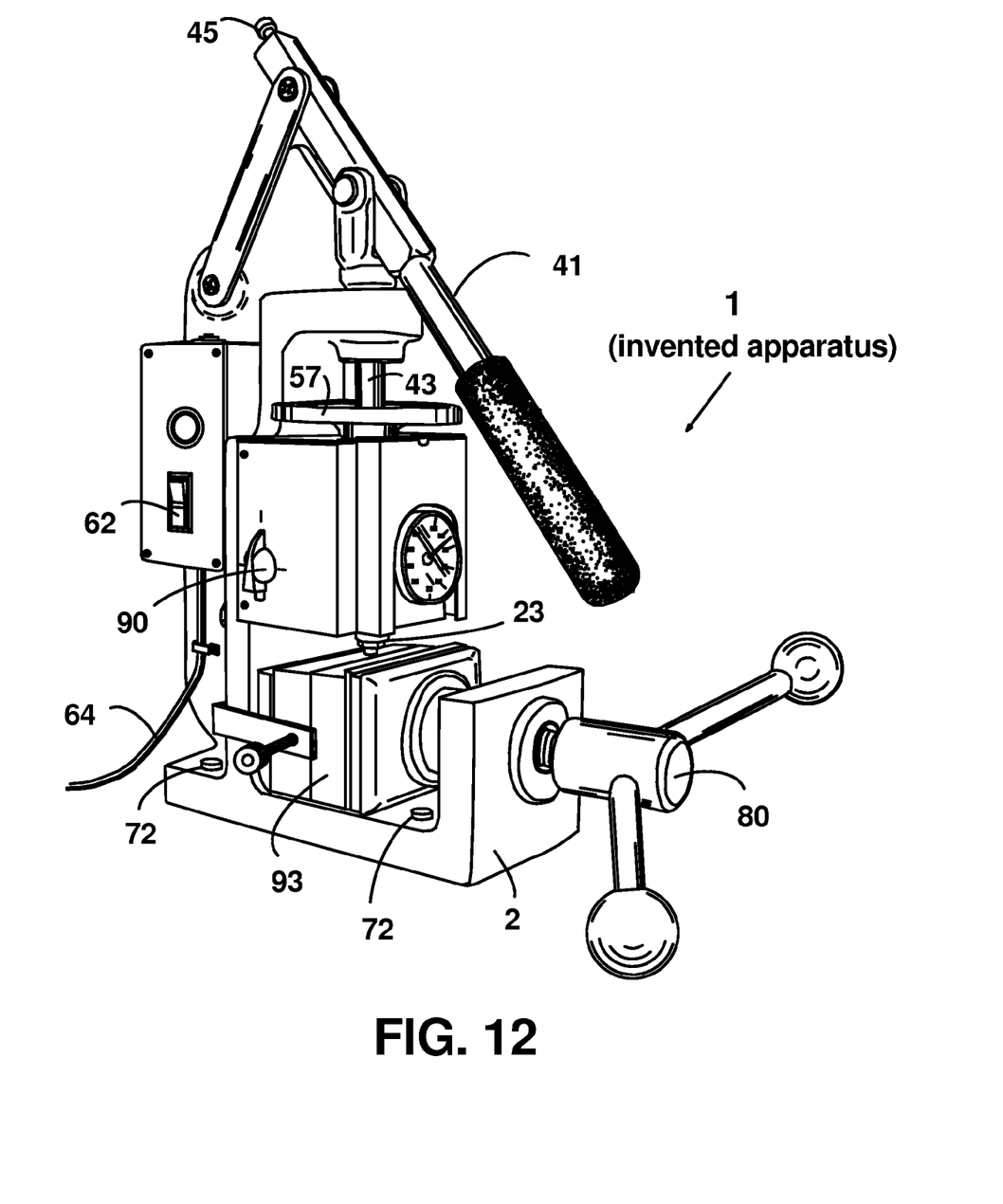
FIG. 12 is a perspective view of the invented apparatus with a mold secured by the mold clamping means.

Accordingly, as shown in FIG. 12, except for as already provided, in one preferred embodiment; the invented apparatus 1 is first secured to a workbench or table by any desired means, typically bolts 72. The handle 41 is then lifted to its upright position before turning on the machine. The power cord 64 is then plugged in and the power switch 62 is turned on. The temperature sensing (and control) means 28 is then adjusted to a desired temperature by turning the attached control knob 90 to a desired position, which may vary depending on the type of plastic to be melted. While waiting for the heater block 21 to reach the desired temperature, a mold 93 is positioned directly underneath the injection nozzle 23 and secured in place by tightening the mold clamping means 80 against it. Plastic pellets (not shown) are then poured into the pellet tray 57, allowing them to funnel into the injection tube 22, and are given sufficient time to melt. The handle 41 is then pulled down by the user with a quick, but smooth motion, causing the injection ram 43 to lower into the injection tube 22. When the injection ram 43 makes contact with the thermoplastic material in the injection tube 22, the actuating means 26 suspending the heater block 21 begins to compress, thus lowering the heater block 21 until the injection nozzle 23 is tightly pressed against the mold 93. As the user continues applying a harder downward force on the handle 41, the melted thermoplastic material is forced out of the injection nozzle 23 and directed into the mold 93. When the mold cavity is full, the user then lifts the handle 41 up until the catch pin 45 is received by the catching means 92, thereby securing the handle 41 in the upright position. It should be noted at this point, as alluded to earlier, the utility advantage of having the back fin 9 higher than the back wall 5 and nose 7 is that it allows the catch clip 92 to be mounted in close proximity with the catch pin 45 of the handle 41. Another advantage of the back fin 9 configuration is that it prevents the handle 41 from being lifted beyond a certain point if the catch pin 45 and catching means 92 become misaligned with each other, or otherwise fail to work. In that instance, the bottom surface of the handle 41 would butt up against the back fin 9 at a predetermined point above the nose 7 and back wall 5, preventing the handle 41 from being lifted any further. After the handle 41 is lifted, the mold clamping means 80 is loosened and the mold 93 is removed from the invented apparatus 1. The two halves of the mold 93 are then separated from each other to reveal the injection molded article. After the user is finished using the machine, the injection tube 22 is purged of any residual plastic by simply pulling down the handle 41 with no mold in place, thereby expelling the left over plastic onto the base 3 of the stand 2, or if desired into a container placed underneath the injection nozzle 23.

I claim:

1. An injection molding machine apparatus comprising at least:
   a main support structure;
   a prefabricated heat unit sub-assembly comprising at least a support means, a means for containing a thermoplastic material, a means for heating a thermoplastic material, a means for transferring heat, a means for directing the flow of a thermoplastic material, a means to actuate motion, a means to sense temperature, a means for electrical connection;
   a prefabricated handle sub-assembly comprising at least a handle means, a ram means, a swivel means, a hinge means, a securing means;
   a prefabricated control box sub-assembly comprising at least an enclosure means, a power control means, a cord member, a means for electrical connection;
   a mold clamping means comprising at least a handle means, an actuating member, a push plate;
   electrical communication between at least the control box sub-assembly and the heat unit sub-assembly.

2. In the apparatus of claim 1, wherein the heat unit sub-assembly further comprises an adjustment means.

3. In the apparatus of claim 1, wherein the heat unit sub-assembly further comprises a temperature probe port.

4. In the apparatus of claim 1, wherein the heat unit sub-assembly further comprises a protective means.

5. In the apparatus of claim 1, wherein the ram means of the handle sub-assembly comprises multiple components.

6. In the apparatus of claim 1, wherein the handle means of the handle sub-assembly is extendible in length.

7. In the apparatus of claim 1, wherein the handle sub-assembly further comprises a releasable interlocking means.

8. In the apparatus of claim 1, wherein the enclosure means of the control box sub-assembly comprises a fixedly mounted portion and a removable portion.

9. In the apparatus of claim 1, wherein the mold clamping means further comprises a removable push plate face.

10. In the apparatus of claim 1, wherein a portion of the main support structure extends above the remainder of the said structure.

11. In the apparatus of claim 1 further comprising an adjustable position backing plate.

12. In the apparatus of claim 1 further comprising at least one temperature display means.

13. In the apparatus of claim 1 further comprising at least one status indicator.

14. In the apparatus of claim 1 further comprising at least one illumination means.

15. In the apparatus of claim 1 further comprising a thermoplastic stripping means.

16. In the apparatus of claim 1 further comprising a temperature responsive paint.

17. In the apparatus of claim 1 further comprising an enclosure means.

18. In the apparatus of claim 1 further comprising a pellet tray.

19. A method of constructing an injection molding machine apparatus, comprising the steps of:
   providing at least a main support structure; a prefabricated heat unit sub-assembly, comprising at least a support means, a means for containing a thermoplastic material, a means for heating a thermoplastic material, a means for transferring heat, a means for directing the flow of a thermoplastic material, a means to actuate motion, a means to sense temperature, a means for electrical connection; a prefabricated handle sub-assembly, comprising at least a handle means, a ram means, a swivel means, a hinge means, a securing means; a prefabricated control box sub-assembly comprising at least an enclosure means, a power control means, a cord member, a means for electrical connection; a mold clamping means, comprising at least a handle means, an actuating member, a push plate;
   attaching the heat unit sub-assembly, the handle sub-assembly, the control box sub-assembly, and mold clamping means to the main support structure in any desired order;
   electrically integrating at least the control box sub-assembly with the heat unit sub-assembly.

* * * * *